(12) United States Patent
Lefevre et al.

(10) Patent No.: US 9,440,480 B2
(45) Date of Patent: Sep. 13, 2016

(54) DOUBLE-LAYERED SHEET SYSTEMS (71) Applicant: Magnum Magnetics Corporation, Marietta, OH (US)

(72) Inventors: Richard D. Lefevre, Oconomowoc, WI (US); Cameron Fouss, Marietta, OH (US)

(73) Assignee: Magnum Magnetics Corporation, Marietta, OH (US)

( * ) Notice: Subject to any disclaimer, the term of this patent is extended or adjusted under 35 U.S.C. 154(b) by 177 days.

(21) Appl. No.: 13/908,835

(22) Filed: Jun. 3, 2013

(65) Prior Publication Data

US 2013/0323475 A1 Dec. 5, 2013

Related U.S. Application Data

(60) Provisional application No. 61/676,273, filed on Jul. 26, 2012, provisional application No. 61/655,397, filed on Jun. 4, 2012.

(51) Int. Cl.

| | |
|---|---|
| *B42D 15/02* | (2006.01) |
| *C09D 123/28* | (2006.01) |
| *G11B 5/68* | (2006.01) |
| *G11B 5/706* | (2006.01) |
| *B42D 15/08* | (2006.01) |
| *B44C 1/14* | (2006.01) |
| *B42D 15/04* | (2006.01) |
| *B32B 27/10* | (2006.01) |
| *B42D 15/00* | (2006.01) |

(52) U.S. Cl.
CPC .............. *B42D 15/02* (2013.01); *B32B 27/10* (2013.01); *B42D 15/045* (2013.01); *B42D 15/08* (2013.01); *B44C 1/14* (2013.01); *C09D 123/286* (2013.01); *G11B 5/68* (2013.01); *G11B 5/70678* (2013.01); *B32B 2250/03* (2013.01); *B32B 2307/208* (2013.01); *B42D 15/0093* (2013.01); *Y10T 428/24802* (2015.01); *Y10T 428/31678* (2015.04); *Y10T 428/31681* (2015.04); *Y10T 428/31692* (2015.04); *Y10T 428/31699* (2015.04); *Y10T 428/31703* (2015.04); *Y10T 428/32* (2015.01)

(58) Field of Classification Search
CPC .. B42D 15/02; B42D 15/08; C09D 123/286; G11B 5/68; G11B 5/70678
See application file for complete search history.

(56) References Cited

U.S. PATENT DOCUMENTS

| | | | |
|---|---|---|---|
| 4,887,763 A | 12/1989 | Sano | |
| 5,676,307 A | 10/1997 | Martin | |
| 5,868,498 A | 2/1999 | Martin | |
| 6,024,278 A | 2/2000 | Martin | |
| 6,153,280 A | 11/2000 | Uffmann | |
| 6,743,493 B2 | 6/2004 | Crum et al. | |
| 7,063,258 B1 | 6/2006 | Karolewicz | |
| 7,128,798 B2 | 10/2006 | Boudouris et al. | |
| 7,225,568 B1 | 6/2007 | Rizzo et al. | |

(Continued)

FOREIGN PATENT DOCUMENTS

WO  02092357 A1  11/2002

*Primary Examiner* — Betelhem Shewareged
(74) *Attorney, Agent, or Firm* — Vorys, Sater, Seymour and Pease LLP; William L. Klima; Vincent M DeLuca (57) ABSTRACT

A magnetic sheet system providing flexible magnetic sheets that are digitally printable on both sides and that serve as magnetic postcard stocks for production of customized magnetic postcards.

28 Claims, 3 Drawing Sheets

(56) References Cited

U.S. PATENT DOCUMENTS

| | | |
|---|---|---|
| 7,707,758 B2 | 5/2010 | Stagg |
| 2001/0025443 A1 | 10/2001 | Martin |
| 2002/0130511 A1 | 9/2002 | Thompson et al. |
| 2003/0049404 A1 | 3/2003 | Mercer et al. |
| 2005/0181188 A1 | 8/2005 | Jaynes |
| 2005/0205831 A1* | 9/2005 | Ono ............................ 252/62.54 |
| 2006/0166026 A1 | 7/2006 | Boudouris et al. |
| 2006/0266809 A1 | 11/2006 | Wert et al. |
| 2009/0189722 A1 | 7/2009 | Xiaoming |
| 2010/0028667 A1 | 2/2010 | Love |
| 2010/0096465 A1 | 4/2010 | Stagg |
| 2010/0282825 A1 | 11/2010 | Wang |
| 2011/0139860 A1 | 6/2011 | Mueller |

* cited by examiner

DOUBLE-LAYERED SHEET SYSTEMS

CROSS-REFERENCE TO RELATED APPLICATION

The present application is related to and claims priority from prior provisional application Ser. No. 61/655,394, filed Jun. 4, 2012, entitled "DOUBLE-LAYERED SHEET SYSTEMS"; and, this application is related to and claims priority from prior provisional application Ser. No. 61/676,273, filed Jul. 26, 2012, entitled "DOUBLE-LAYERED SHEET SYSTEMS", the contents of all of which are incorporated herein by this reference and are not admitted to be prior art with respect to the present invention by the mention in this cross-reference section.

BACKGROUND

This invention relates to providing a system to improve double-layered flexible magnetic sheets. More particularly, this invention relates to providing double-layered (including double-laminated) flexible magnetic sheets that are digitally printable on both sides. More particularly, this invention relates to providing flexible magnetic sheets that are customizable for mailing to consumers as postal-service-compliant magnetic postcards for direct-mail advertising purposes.

Postcards and other similarly-formatted printed materials represent a significant portion of direct-mail advertising. Unlike other forms of direct-mail advertising, printed postcards do not require opening or unfolding and are therefore successful at capturing immediate consumer attention. Providing enhanced options with respect to the types of materials on which such advertising is printed, mailed, and displayed would benefit many.

OBJECTS AND FEATURES OF THE INVENTION

A primary object and feature of the present invention is to provide a system overcoming the above-mentioned problem(s).

It is a further object and feature of the present invention to provide such a system providing a magnetizable sheet that can be customized to generate postal-service-compliant postcards. It is a further object and feature of the present invention to provide a magnetizable sheet that is sufficiently thin such that it can be mailed as a postal-service-compliant postcard. It is a further object and feature of the present invention to provide a magnetizable sheet that is sufficiently thin such that it can be fed into a digital press printer. It is a further object and feature of the present invention to provide a magnetizable sheet having sufficient rigidity such that it can be fed into digital press printers with at least adequate print registration. Yet another object and feature of the present invention is to provide a magnetizable sheet that, once magnetized, has a magnetic strength that complies with postal service regulations such that it can be mailed at least as a United States Postal Service (U.S.P.S.) postal-service-compliant postcard.

Yet another object and feature of the present invention is to provide a magnetizable sheet with two printable surfaces that are receptive to digital press printing. Another object and feature of the present invention is to provide a magnetizable sheet with two printable surfaces that allows the customer to print customized images, colors, and/or text on the printable surfaces for direct-mail advertising purposes.

Yet another object and feature of the present invention is to provide a magnetizable sheet with one or two printable foil surfaces that allows the customer to create customized metallic effects for direct-mail advertising purposes.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to providing at least one magnetic postcard stock available for customer customization to generate at least one customized magnetic postcard, comprising: at least one printable-magnetizable-sheet structured and arranged to provide at least one magnetizable-sheet receptive to printing on at least one first printable surface and at least one second printable surface; wherein such at least one printable-magnetizable-sheet comprises at least one magnetizable-layer structured and arranged to provide at least one permanent magnetic field upon magnetization by at least one magnetic field source; wherein such at least one magnetizable-layer comprises at least one magnetizable-material structured and arranged to be magnetized by such at least one magnetic field source; and wherein such at least one magnetizable-layer further comprises at least one binder structured and arranged to bind such at least one magnetizable material in such at least one magnetizable-layer; at least one first indicia-acceptor structured and arranged to accept at least one first indicia on such at least one first printable surface; and at least one second indicia-acceptor structured and arranged to accept at least one second indicia on such at least one second printable surface; and at least one metallic-effect generator structured and arranged to generate at least one metallic effect on such at least one first printable surface upon acceptance of such at least one first indicia; wherein such at least one printable-magnetizable-sheet comprises at least one thickness suitable for mailing as at least one postal-service-compliant postcard; and wherein such at least one printable-magnetizable-sheet provides the at least one magnetic postcard stock available for customer-customization to generate the at least one customized magnetic postcard.

Moreover, it provides such a system wherein such at least one printable-magnetizable-sheet comprises at least one geometry structured and arranged to permit cutting of such at least one printable-magnetizable-sheet into at least one width and at least one length suitable for mailing as such at least one postal-service-compliant postcard. Additionally, it provides such a system further comprising at least one magnetic-field-strength-attenuator structured and arranged to attenuate the strength of such at least one permanent magnetic field to at least one magnetic field strength suitable for mailing as such at least one postal-service-compliant postcard. Also, it provides such a system wherein such at least one thickness is between about one hundredth of an inch and three-tenths of an inch. In addition, it provides such a system wherein: such at least one first indicia-acceptor is further structured and arranged to accept such at least one first indicia from at least one printer; and such at least one second indicia-acceptor is further structured and arranged to accept such at least one second indicia from such at least one printer. And, it provides such a system wherein such at least one printer comprises at least one digital press printer.

Further, it provides such a system wherein such at least one metallic-effect-generator comprises at least one metallic foil layer. Even further, it provides such a system wherein such at least one metallic-effect-generator is laminated to at least one first surface of such at least one magnetizable-layer. Moreover, it provides such a system wherein such at least one first indicia-acceptor comprises at least one indicia-accepting coating on such at least one metallic foil layer. Additionally, it provides such a system wherein such at least one second indicia-acceptor comprises at least one indicia-accepting coating on at least one second surface of such at least one magnetizable-layer. Also, it provides such a system wherein such at least one indicia-accepting coating comprises at least one ultraviolet-light-curable coating. In addition, it provides such a system wherein such at least one indicia-accepting coating is flexographically applied to such at least one second surface. And, it provides such a system wherein such at least one indicia-accepting coating is applied to such at least one second surface using at least one gravure coating roll.

Further, it provides such a system wherein such at least one second indicia-acceptor comprises at least one indicia-accepting layer laminated to at least one second surface of such at least one magnetizable-layer. Even further, it provides such a system wherein such at least one indicia-accepting layer comprises paper. Moreover, it provides such a system wherein such at least one indicia-accepting layer comprises at least one indicia-accepting polymer. Additionally, it provides such a system wherein such at least one indicia-accepting polymer is selected from the group consisting of polypropylene, polyester, and polyvinyl chloride. Also, it provides such a system wherein such at least one second indicia-acceptor comprises at least one indicia-accepting formulation of such at least one magnetizable-layer.

In addition, it provides such a system wherein such at least one binder is further structured and arranged to provide flexibility to such at least one magnetizable-layer. And, it provides such a system wherein such at least one binder comprises chlorinated polyethylene. Further, it provides such a system wherein such at least one magnetizable-layer further comprises at least one stiffener structured and arranged to stiffen such at least one magnetizable-layer. Even further, it provides such a system wherein such at least one stiffener comprises low-density polyethylene. Moreover, it provides such a system wherein such at least one stiffener is selected from the group consisting of low-density polyethylene and at least one biologically-derived polyester resin. Additionally, it provides such a system wherein such at least one stiffener further comprises at least one biologically-derived polyester resin. Also, it provides such a system wherein such at least one magnetizable-material comprises at least one ferrite powder selected from the group consisting of strontium ferrite and barium ferrite.

In accordance with another preferred embodiment hereof, this invention provides a system, relating to providing at least one magnetic postcard stock available for customer customization to generate at least one customized magnetic postcard, comprising: at least one printable-magnetizable-sheet structured and arranged to provide at least one magnetizable-sheet receptive to printing on at least one first printable surface and at least one second printable surface; wherein such at least one printable-magnetizable-sheet comprises at least one magnetizable-layer structured and arranged to provide at least one permanent magnetic field upon magnetization by at least one magnetic field source; wherein such at least one magnetizable-layer comprises at least one magnetizable-material structured and arranged to be magnetized by such at least one magnetic field source; wherein such at least one magnetizable-layer further comprises at least one binder structured and arranged to bind such at least one magnetizable material in such at least one magnetizable-layer; wherein such at least one magnetizable-layer further comprises at least one stiffener structured and arranged to stiffen such at least one magnetizable-layer; wherein such at least one first printable surface comprises at least one first indicia-acceptor structured and arranged to accept at least one indicia from at least one digital press printer; wherein such at least one second printable surface comprises at least one second indicia-acceptor structured and arranged to accept at least one second indicia from such at least one digital press printer; wherein such at least one printable-magnetizable-sheet comprises at least one thickness suitable for mailing as at least one postal-service-compliant postcard; and wherein such at least one printable-magnetizable-sheet provides the at least one magnetic postcard stock available for customer-customization to generate the at least one customized magnetic postcard.

In accordance with another preferred embodiment hereof, this invention provides a system, relating to providing at least one magnetic postcard stock available for customer customization to generate at least one customized magnetic postcard, comprising: at least one printable-magnetizable-sheet structured and arranged to provide at least one magnetizable-sheet receptive to printing on at least one first printable surface and at least one second printable surface; wherein such at least one printable-magnetizable-sheet comprises at least one magnetizable-layer structured and arranged to provide at least one permanent magnetic field upon magnetization by at least one magnetic field source; wherein such at least one magnetizable-layer comprises at least one magnetizable-material structured and arranged to be magnetized by such at least one magnetic field source; and wherein such at least one magnetizable-layer further comprises at least one binder structured and arranged to bind such at least one magnetizable material in such at least one magnetizable-layer; at least one first indicia-acceptor structured and arranged to accept at least one first indicia on such at least one first printable surface; and at least one second indicia-acceptor structured and arranged to accept at least one second indicia on such at least one second printable surface; wherein such at least one first indicia-acceptor comprises at least one ultraviolet-light-curable coating on such at least one first printable surface; wherein such at least one printable-magnetizable-sheet comprises at least one thickness suitable for mailing as at least one postal-service-compliant postcard; and wherein such at least one printable-magnetizable-sheet, provides the at least one magnetic postcard stock available for customer-customization to generate the at least one customized magnetic postcard.

In accordance with another preferred embodiment hereof, this invention provides a system, relating to providing at least one magnetic postcard stock available for customer customization to generate at least one customized magnetic postcard, comprising: printable-magnetizable-sheet means for providing at least one magnetizable-sheet receptive to printing on at least one first printable surface and at least one second printable surface; wherein such printable-magnetizable-sheet means comprises magnetizable-layer means for providing at least one permanent magnetic field upon magnetization by at least one magnetic field source; wherein such magnetizable-layer means comprises magnetizable-material means for being magnetized by such at least one magnetic field source; and wherein such magnetizable-layer means further comprises binder means for binding such magnetizable-material means in such magnetizable-layer means; first indicia-acceptor means for accepting at least one first indicia on such at least one first printable surface; second indicia-acceptor means for accepting at least one second indicia on such at least one second printable surface; and metallic-effect generator means for generating at least one metallic effect on such at least one first printable surface upon acceptance of such at least one first indicia; wherein such printable-magnetizable-sheet means comprises at least one thickness suitable for mailing as at least one postal-service-compliant postcard; and wherein such printable-magnetizable-sheet means provides the at least one magnetic postcard stock available for customer-customization to generate the at least one customized magnetic postcard.

In accordance with another preferred embodiment hereof, this invention provides a method, relating to manufacturing at least one magnetic postcard stock available for customer customization to generate at least one customized magnetic postcard, comprising the steps of: mixing at least one magnetizable-material, at least one binder, and at least one stiffener to form at least one magnetizable-mixture; shaping such at least one magnetizable-mixture into at least one sheet structure using at least one shaping technique selected from the group consisting of at least one extrusion method and at least one calendering method; applying at least one first printable layer to at least one first surface of such at least one magnetizable-sheet using at least one application method selected from the group consisting of lamination, flexographic coating, gravure coating, and spraying; and applying at least one second printable layer to at least one second surface of such at least one magnetizable-sheet using at least one application method selected from the group consisting of lamination, flexographic coating, gravure coating, and spraying; wherein such step of applying such at least one first printable layer and such step of applying such at least one second printable layer generates at least one printable-magnetizable-sheet receptive to printing on such at least one first printable layer and such at least one second printable layer; distributing such at least one printable-magnetizable-sheet to at least one customer; wherein such step of distributing such at least one printable-magnetic-sheet provides such at least one customer with the at least one magnetic postcard stock available for customer-customization to generate the at least one customized magnetic postcard. In addition, it provides such a method further comprising the steps of: providing such at least one customer the option of printing at least one first indicia on such at least one first printable layer using at least one digital press printer; providing such at least one customer the option of printing at least one second indicia on such at least one second printable layer using such at least one digital press printer; and providing such at least one customer the option of cutting such at least one printable-magnetic-sheet into at least one length and at least one width acceptable for mailing as at least one postal-service-compliant postcard.

And, it provides such a system further comprising the step of cutting such at least one printable-magnetizable-sheet into at least one shape suitable for distribution to such at least one customer prior to the step of distributing such at least one printable-magnetizable-sheet to such at least one customer. Further, it provides such a system further comprising the step of permanently magnetizing such at least one printable-magnetizable-sheet by exposing such at least one printable-magnetizable-sheet to at least one magnetic-field-source.

In accordance with another preferred embodiment hereof, this invention provides a system, relating to providing at least one magnetic postcard stock available for customer customization to generate at least one customized magnetic postcard, comprising: at least one printable-magnetizable-sheet structured and arranged to provide at least one magnetizable-sheet receptive to printing on at least one first printable surface and at least one second printable surface; wherein such at least one printable-magnetizable-sheet comprises at least one magnetizable-layer structured and arranged to provide at least one permanent magnetic field upon magnetization by at least one magnetic field source; wherein such at least one magnetizable-layer comprises at least one magnetizable-material structured and arranged to be magnetized by such at least one magnetic field source; wherein such at least one magnetizable-material comprises at least one ferrite powder selected from the group consisting of strontium ferrite and barium ferrite; wherein such at least one magnetizable-layer further comprises at least one binder structured and arranged to bind such at least one magnetizable material in such at least one magnetizable-layer; wherein such at least one binder comprises chlorinated polyethylene; wherein such at least one magnetizable-layer further comprises at least one stiffener structured and arranged to stiffen such at least one magnetizable-layer; and wherein such at least one stiffener is selected from the group consisting of low-density polyethylene, at least one biologically-derived polyester resin, and at least one mixture of such low-density polyethylene and such at least one biologically-derived polyester resin; at least one first indicia-acceptor structured and arranged to accept at least one first indicia on such at least one first printable surface; and at least one second indicia-acceptor structured and arranged to accept at least one second indicia on such at least one second printable surface; wherein such at least one first indicia-acceptor is further structured and arranged to accept such at least one first indicia from at least one digital press printer; and wherein such at least one second indicia-acceptor is further structured and arranged to accept such at least one second indicia from such at least one digital press printer; at least one metallic-effect generator structured and arranged to generate at least one metallic effect on such at least one first printable surface upon acceptance of such at least one indicia; wherein such at least one metallic-effect-generator comprises at least one metallic foil layer; wherein such at least one first indicia-acceptor comprises at least one indicia-accepting coating on such at least one metallic foil layer; wherein such at least one metallic-effect-generator is laminated to at least one first surface of such at least one magnetizable-layer; wherein such at least one printable-magnetizable-sheet comprises at least one thickness suitable for mailing as at least one postal-service-compliant postcard; wherein such at least one thickness is between about one hundredth of an inch and about three-tenths of an inch; wherein such at least one printable-magnetizable-sheet comprises at least one geometry structured and arranged to permit cutting of such at least one printable-magnetizable-sheet into at least one length and at least one width suitable for mailing as at least one postal-service-compliant postcard; and wherein such at least one printable-magnetizable-sheet provides the at least one magnetic postcard production intermediate available for customer-customization to generate the at least one customized magnetic postcard. In addition, this invention provides each and every novel feature, element, combination, step and/or method disclosed by this patent application.

DETAILED DESCRIPTION OF THE BEST MODES AND PREFERRED EMBODIMENTS OF THE INVENTION

Figure 1:
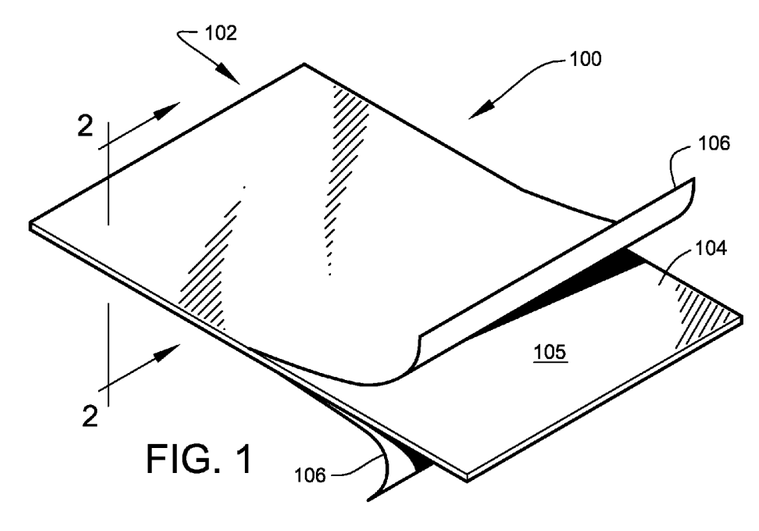
FIG. 1 shows a perspective view, illustrating a double-printable magnetizable sheet of double-printable magnetic sheet systems, according to a preferred embodiment of the present invention.
Figure 2:
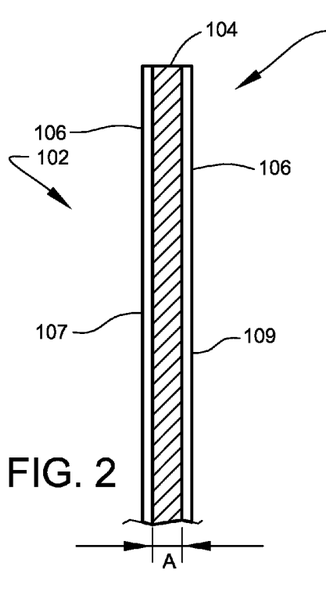
FIG. 2 shows a sectional view, through the section 2-2 of FIG. 1, according to the preferred embodiment of FIG. 1.
Figure 3:
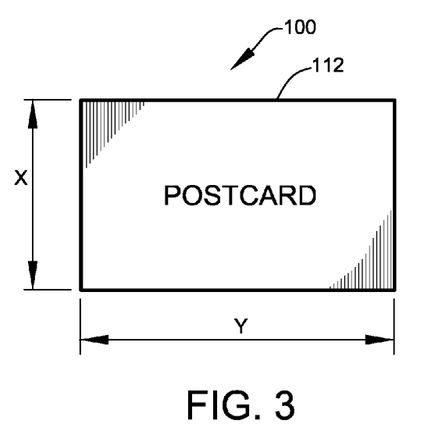
FIG. 3 shows a perspective view, illustrating a customized magnetic postcard generated from the double-printable magnetizable sheet, according to the preferred embodiment of FIG. 1.

FIG. 1 shows a perspective view, illustrating double-printable magnetizable sheet 102 of double-printable magnetic sheet systems 100, according to the preferred embodiment of the present invention. FIG. 2 shows a sectional view, through the section 2-2 of FIG. 1, according to the preferred embodiment of FIG. 1. FIG. 3 shows a perspective view, illustrating at least one customized magnetic postcard 112 generated from double-printable magnetizable sheet 102, according to the preferred embodiment of FIG. 1. Double-printable magnetizable sheet 102 (at least embodying herein at least one printable-magnetizable-sheet structured and arranged to provide at least one magnetizable-sheet receptive to printing on at least one first printable surface and at least one second printable surface; and, at least embodying herein printable-magnetizable-sheet means for providing at least one magnetizable-sheet receptive to printing on at least one first printable surface and at least one second printable surface) preferably comprises a magnetizable sheet that is printable on both surfaces, as shown. Double-printable magnetizable sheet 102 preferably comprises a magnetizable sheet stock for production of customized magnetic postcards 112, as shown (see further details below). Double-printable magnetizable sheet 102 preferably is customized by at least one customer to generate customized magnetic postcard 112 (see details below). Customized magnetic postcard 112 preferably is employed by the customer for direct-mail advertising purposes. Upon reading this specification, those with ordinary skill in the art will now appreciate that, under appropriate circumstances, considering such issues as design preference, user preference, cost, changing needs, etc., other types of postcards may suffice.

Double-printable magnetizable sheet 102 preferably comprises a sheet thickness A that preferably meets United States Postal Service (USPS) regulations for mailing as a postcard; see details below (this arrangement at least herein embodying wherein such at least one printable-magnetizable-sheet comprises at least one thickness suitable for mailing as at least one postal-service-compliant postcard; and, this arrangement at least herein embodying wherein such printable-magnetizable-sheet means comprises at least one thickness suitable for mailing as at least one postal-service-compliant postcard). Further, thickness A of double-printable magnetizable sheet 102 preferably is suitable for feeding into at least one printer, preferably at least one digital printer, preferably at least one modern digital press printer such as, for example, those digital press printers sold under the trademarks HP® Indigo, Kodak® Nexpress, and Xerox® Igen printers (see details below). Sheet thickness A preferably is between about one hundredth of an inch and about three-tenths of an inch. Upon reading this specification, those with ordinary skill in the art will now appreciate that, under appropriate circumstances, considering such issues as design preference, manufacturer preference, user preference, cost, changing needs, changing postal service regulations, types of printers used, etc., other sheet thicknesses may suffice.

Double-printable magnetizable sheet 102 preferably comprises sufficient rigidity in order to preferably ensure at least adequate print registration with digital press printers (see further details below). Upon reading this specification, those with ordinary skill in the art will now appreciate that, under appropriate circumstances, considering such issues as design preference, manufacturer preference, user preference, cost, changing needs, types of printers used, etc., flexible sheets may suffice.

Double-printable magnetizable sheet 102 preferably comprises at least one magnetizable layer 104, as shown. Upon magnetization with a magnetic field source, magnetizable layer 104 (at least herein embodying wherein such at least one printable-magnetizable-sheet comprises at least one magnetizable-layer structured and arranged to provide at least one permanent magnetic field upon magnetization by at least one magnetic field source; and, at least herein embodying wherein such printable-magnetizable-sheet means comprises magnetizable-layer means for providing at least one permanent magnetic field upon magnetization by at least one magnetic field source) preferably produces a permanent magnetic field and preferably provides double-printable magnetizable sheet 102 with magnetic properties.

Double-printable magnetizable sheet 102 preferably further comprises at least one printable surface 106, preferably two printable surfaces 106, preferably at least one first printable surface 107 and at least one second printable surface 109, as best shown in FIG. 2. Printable surfaces 106 preferably comprise surfaces receptive to printing, preferably digital printing, preferably digital press printing (see details below). Accordingly, printable surfaces 106 preferably are receptive to standard toners and/or standard ink lines used for modern digital presses such as, for example, those toners and/or ink lines used for HP® Indigo, Kodak Nexpress®, and Xerox Igen™ printers. Upon reading this specification, those with ordinary skill in the art will now appreciate that, under appropriate circumstances, considering such issues as design preference, manufacturer preference, user preference, cost, changing needs, future technologies, etc., surfaces receptive to other types of printing, such as, for example, surfaces receptive to offset printing, surfaces receptive to laser printing, surfaces receptive to inkjet printing, surfaces receptive to writing, etc., may suffice.

Printable surfaces 106 preferably further function to attenuate the magnetic field strength of double-printable magnetizable sheet 102 to a magnetic field strength that complies with USPS regulations for mailing as a postcard (this arrangement at least embodying herein at least one magnetic-field-strength-attenuator structured and arranged to attenuate the strength of such at least one permanent magnetic field to at least one magnetic field strength suitable for mailing as such at least one postal-service-compliant postcard).

In a preferred use of double-printable magnetizable sheet 102, a customer preferably prints at least one color, at least one image, at least one metallic effect, and/or at least one text on one or both printable surfaces 106 in order to preferably customize the display on customized magnetic postcard 112, as shown (see further details below). The customer preferably customizes the color, image, metallic effect, and/or text displayed on one or both printable surfaces 106 of double-printable magnetizable sheet 102 for direct-mail advertising purposes (see details below). Printing on double-printable magnetizable sheet 102 preferably is achieved using at least one printer, preferably at least one digital printer, preferably at least one digital press printer. Upon reading this specification, those with ordinary skill in the art will now appreciate that, under appropriate circumstances, considering such issues as design preference, user preferences, marketing preferences, cost, structural requirements, available materials, technological advances, etc., other indicia arrangements such as, for example, symbols, logos, numbers, photographs, etc., may suffice.

Magnetizable layer 104 preferably comprises at least one magnetizable material capable of being magnetized by exposure to a magnetic field source, preferably at least one ferrite powder, preferably at least one strontium ferrite powder ($SrFe_{12}O_{19}$), alternately preferably at least one barium ferrite powder ($BaFe_{12}O_{19}$). The above arrangement at least herein embodies wherein such at least one magnetizable-layer comprises at least one magnetizable-material structured and arranged to be magnetized by such at least one magnetic field source; and, this arrangement at least herein embodies wherein such magnetizable-layer means comprises magnetizable-material means for being magnetized by such at least one magnetic field source. The above-described ferrite powder preferably is obtained from Hoosier Magnetics, Inc. located in Ogdensburg, N.Y., product number HM 410 (http://www.hoosiermagneticsinc.com/index.html). Alternately preferably, the above-described ferrite powder is obtained in recycled powder form from TDK Corporation (http://www.tdk.com/). Upon reading this specification, those with ordinary skill in the art will now appreciate that, under appropriate circumstances, considering such issues as design preference, manufacturer preference, cost, changing needs, future technologies, etc., other magnetizable materials such as, for example, magnetic materials containing nickel, magnetic materials containing cobalt, magnetic materials containing gadolinium, other ferromagnetic materials, etc., may suffice.

Magnetic layer 104 preferably further comprises at least one polymeric binder that preferably functions to bind such magnetizable material in magnetizable layer 104 (this arrangement at least herein embodying wherein such at least one magnetizable-layer further comprises at least one binder structured and arranged to bind such at least one magnetizable material in such at least one magnetizable-layer; and, this arrangement at least herein embodying wherein such magnetizable-layer means further comprises binder means for binding such magnetizable-material means in such magnetizable-layer means). Moreover, such polymeric binder preferably provides flexible properties to double-printable magnetizable sheet 102 (this arrangement at least herein embodying wherein such at least one binder is further structured and arranged to provide flexibility to such at least one magnetizable-layer). Such polymeric binder preferably comprises at least one flexible thermoplastic polymer, preferably at least one chlorinated polyethylene (CPE) elastomer. Such chlorinated polyethylene (CPE) elastomer preferably is obtained from Alternative Rubber and Plastics, Inc. located in Amherst, N.Y., product number CM 301 (http://www.altrubber.com/). Upon reading this specification, those skilled in the art will now appreciate that, under appropriate circumstances, considering such issues as cost, changing needs, manufacturer preference, design preference, future technologies, etc., other polymeric binder materials, such as, for example, flexible resins, chlorosulfonated polyethylene rubber, polyisobutylene, ethylene vinyl acetate (EVA) copolymer, elastomeric binders, polypropylene elastomers, ethylene-octene copolymers, etc., may suffice.

Magnetizable layer 104 preferably further comprises at least one stiff binder that preferably functions to maintain adequate rigidity in magnetizable layer 104 such that double-printable magnetizable sheet 102 can be fed into digital press printers with at least adequate print registration (this arrangement at least herein embodying wherein such at least one magnetizable-layer further comprises at least one stiffener structured and arranged to stiffen such at least one magnetizable-layer). Such stiff binder preferably comprises at least one polyethylene polymer, preferably at least one low-density polyethylene (LDPE) polymer. Alternately preferably, such stiff binder comprises at least one surfactant, preferably at least one biologically-derived polyester resin surfactant. Such biologically-derived polyester resin surfactant preferably is sold under the trademark BIOREZ® supplied from Advanced Image Resources, LLC located in Alpharetta, Ga. (http://www.air-toner.com/). Alternatively preferably, such stiff binder comprises at least one mixture of at least one low-density polyethylene polymer and at least one biologically-derived polyester resin surfactant. Upon reading this specification, those skilled in the art will now appreciate that, under appropriate circumstances, considering such issues as cost, changing needs, manufacturer preference, design preference, future technologies, etc., other stiffening materials, such as, for example, linear low-density polyethylene, ethylene vinyl acetate (EVA) copolymer, other stiffening polymeric binders, stiffening plastics, rubbers, polymeric resins, addition of additional surfactants, etc., may suffice. Upon reading this specification, those skilled in the art will now appreciate that, under appropriate circumstances, considering such issues as cost, changing needs, manufacturer preference, design preference, future technologies, etc., other surfactants, such as, for example, stearic acid, calcium stearate, tackifying resins, rosin esters, abietic acid esters, terpene phenolic resins, etc., may suffice.

Double-printable magnetizable sheet 102 preferably comprises first printable surface 107 and second printable surface 109, as shown. First printable surface 107 and second printable surface 109 preferably each comprise at least one type of printable surface 106 listed in Table 1 below. First printable surface 107 preferably comprises at least one indicia-accepting foil layer 202 (see FIG. 4 and further details below), alternatively preferably at least one indicia-accepting coating, alternately preferably at least one indicia-accepting laminated layer, alternately preferably at least one indicia-accepting formulation of magnetic layer surface, as shown in Table 1 (this arrangement at least embodying herein at least one first indicia-acceptor structured and arranged to accept at least one first indicia on such at least one first printable surface; and, this arrangement at least embodying herein first indicia-acceptor means for accepting at least one first indicia on such at least one first printable surface; and, this arrangement at least herein embodying wherein such at least one first printable surface comprises at least one first indicia-acceptor structured and arranged to accept at least one indicia from at least one digital press printer). Likewise, second printable surface 109 preferably comprises at least one indicia-accepting foil layer 202 (see FIG. 4 and further details below), alternatively preferably at least one indicia-accepting coating, alternately preferably indicia-accepting laminated layer, alternately preferably at least one indicia-accepting formulation of magnetic layer surface, as shown in Table 1 (this arrangement at least embodying herein at least one second indicia-acceptor structured and arranged to accept at least one second indicia on such at least one second printable surface; and, this arrangement at least embodying herein second indicia-acceptor means for accepting at least one second indicia on such at least one second printable surface; and, this arrangement at least herein embodying wherein such at least one second printable surface comprises at least one second indicia-acceptor structured and arranged to accept at least one second indicia from such at least one digital press printer). Accordingly, multiple combinations of printable surfaces 106 preferably are possible for double-printable magnetizable sheet 102. Upon reading this specification, those with ordinary skill in the art will now appreciate that, under appropriate circumstances, considering such issues as design preference, manufacturer preference, user preference, cost, changing needs, future technologies, etc., other types of printable surfaces, such as, for example, indicia-accepting textile surfaces, indicia-accepting magnetic strips, etc., may suffice.

TABLE 1

Types of Printable Surfaces 106.

Figure 4:
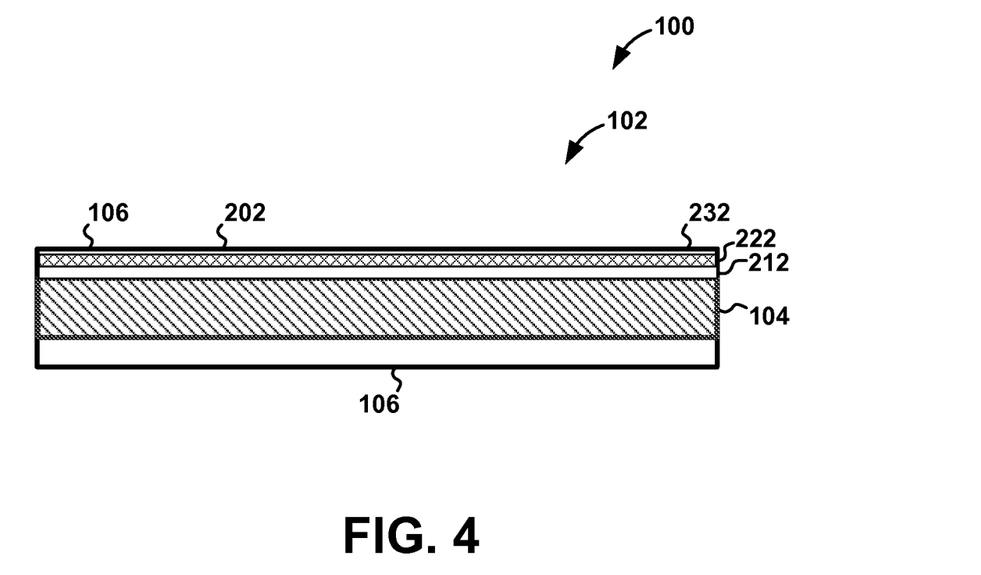
FIG. 4 shows a side view, illustrating a double-printable magnetizable sheet comprising an indicia-accepting foil layer, according to a preferred embodiment of the present invention.

Indicia-accepting foil layer 202
Indicia-accepting coating 232
Indicia-accepting laminated layer
Indicia-accepting formulation of magnetic layer surface FIG. 4 shows a side view, illustrating double-printable magnetizable sheet 102 comprising at least one indicia-accepting foil layer 202, according to a preferred embodiment of the present invention. Indicia-accepting foil layer 202 (at least embodying herein at least one metallic-effect generator structured and arranged to generate at least one metallic effect on such at least one first printable surface upon acceptance of such at least one first indicia; and, at least embodying herein metallic-effect generator means for generating at least one metallic effect on such at least one first printable surface upon acceptance of such at least one first indicia) preferably provides at least one customer with the ability to create customized metallic effects on at least one printable surface 106 of double-printable magnetizable sheet 102. Such customized metallic effects preferably are generated on indicia-accepting foil layer 202 by printing on indicia-accepting foil layer 202 using at least one digital printer, preferably at least one digital press printer. Upon reading this specification, those with ordinary skill in the art will now appreciate that, under appropriate circumstances, considering such issues as design preference, manufacturer preference, user preference, cost, changing needs, future technologies, etc., other types of printers, such as, for example, offset printers, laser printers, inkjet printers, etc., may suffice.

Such customized metallic effects preferably comprise customized metallic finishes, brass finishes, aluminum-foil finishes, mirror finishes, chrome finishes, custom-colored metallic finishes, and faux metal finishes. Upon reading this specification, those with ordinary skill in the art will now appreciate that, under appropriate circumstances, considering such issues as design preference, manufacturer preference, user preference, cost, changing needs, future technologies, etc., other types of effects, such as, for example, holographic effects, other metallic effects, eco-friendly metallic finishes, etc., may suffice.

Indicia-accepting foil layer 202 preferably comprises at least one metallic foil layer 222 (at least herein embodying wherein such at least one metallic-effect-generator comprises at least one metallic foil layer), as shown in FIG. 4. Metallic foil layer 222 preferably is responsible for producing customized metallic effects and preferably comprises at least one aluminum foil layer, alternately preferably at least one copper foil layer, alternately preferably at least one metal alloy foil layer. Upon reading this specification, those with ordinary skill in the art will now appreciate that, under appropriate circumstances, considering such issues as design preference, manufacturer preference, user preference, cost, changing needs, future technologies, etc., other metallic foil materials, such as, for example, tin foil, gold foil, magnetic foils, foil paper, etc., may suffice.

Indicia-accepting foil layer 202 preferably further comprises at least one bonding layer 212, as shown in FIG. 4. Bonding layer 212 preferably is responsible for joining indicia-accepting foil layer 202 to magnetizable layer 104 by lamination (this arrangement at least herein embodying wherein such at least one metallic-effect-generator is laminated to at least one first surface of such at least one magnetizable-layer). Indicia-accepting foil layer 202 preferably is laminated to magnetizable layer surface 105 preferably using at least one adhesive, preferably at least one urethane-based adhesive, alternately preferably at least one rubber-based adhesive. Upon reading this specification, those with ordinary skill in the art will now appreciate that, under appropriate circumstances, considering such issues as design preference, manufacturer preference, user preference, cost, changing needs, future technologies, etc., other joining arrangements, such as, for example, gluing, pasting, lamination using other types of adhesives, hot-melt bonding, heat sealing, Indicia-accepting foil layer 202 preferably further comprises at least one indicia-accepting coating 232 on metallic foil layer 222, as shown in FIG. 4. Indicia-accepting coating 232 (at least herein embodying wherein such at least one first indicia-acceptor comprises at least one indicia-accepting coating on such at least one metallic foil layer) preferably comprises at least one indicia-accepting material that preferably is receptive to inks and/or toners used for digital printers, preferably digital press printers. Upon reading this specification, those with ordinary skill in the art will now appreciate that, under appropriate circumstances, considering such issues as design preference, manufacturer preference, user preference, cost, changing needs, future technologies, etc., other indicia-accepting arrangements, such as, for example, coatings receptive to inkjet printing inks, coatings receptive to offset printing inks, coatings receptive to screen printing inks, indicia-accepting foils, coatings receptive to writing, etc., may suffice.

Indicia-accepting foil layer 202 preferably is obtained from Hazen Paper Company (240 South Water St. Holyoke, Mass. 01040). Laminations to magnetizable layer surface 105 preferably are performed at the site of manufacture of double-printable magnetizable sheet 102 (see further details below). Upon reading this specification, those with ordinary skill in the art will now appreciate that, under appropriate circumstances, considering such issues as design preference, manufacturer preference, user preference, cost, changing needs, etc., other lamination arrangements, such as, for example, laminations at the foil production site, laminations performed by the customer, etc., may suffice.

Such indicia-accepting laminated layer (see Table 1) preferably comprises at least one indicia-accepting layer preferably joined to magnetizable layer surface 105 (see FIG. 1). Such indicia-accepting laminated layer preferably is joined to magnetizable layer surface 105 by lamination using at least one adhesive, preferably at least one urethane-based adhesive, alternately preferably at least one rubber-based adhesive. This arrangement at least herein embodies wherein such at least one second indicia-acceptor comprises at least one indicia-accepting layer laminated to at least one second surface of such at least one magnetizable-layer. Upon reading this specification, those with ordinary skill in the art will now appreciate that, under appropriate circumstances, considering such issues as design preference, manufacturer preference, user preference, cost, changing needs, future technologies, etc., other joining arrangements, such as, for example, gluing, hot-melt bonding, laminations using other types of adhesives, other bonding arrangements, etc., may suffice.

Such indicia-accepting laminated layer preferably comprises at least one material layer receptive to inks and/or toners used in digital printers, preferably digital press printers. Upon reading this specification, those with ordinary skill in the art will now appreciate that, under appropriate circumstances, considering such issues as design preference, manufacturer preference, user preference, cost, changing needs, future technologies, etc., other indicia-accepting arrangements, such as, for example, material layers receptive to inkjet printing inks, material layers receptive to offset printing inks, material layers receptive to screen printing inks, material layers receptive to writing, etc., may suffice.

Such indicia-accepting laminated layer preferably comprises paper, alternately preferably at least one indicia-accepting polymer. Such at least one indicia-accepting polymer preferably comprises polypropylene, alternately preferably polyvinyl chloride, alternately preferably polyester. Upon reading this specification, those with ordinary skill in the art will now appreciate that, under appropriate circumstances, considering such issues as design preference, manufacturer preference, user preference, cost, changing needs, future technologies, etc., other indicia-acceptors, such as, for example, indicia-accepting polymer mixtures, polymers receptive to offset printing inks, polymers receptive to screen printing inks, polymers receptive to laser printing inks, polymers receptive to inkjet printing inks, etc., may suffice.

Such indicia-accepting coating (see Table 1) preferably comprises at least one coating that preferably is receptive to inks and/or toners used for digital printers, preferably digital press printers (this arrangement at least herein embodying wherein such at least one second indicia-acceptor comprises at least one indicia-accepting coating on at least one second surface of such at least one magnetizable-layer). Upon reading this specification, those with ordinary skill in the art will now appreciate that, under appropriate circumstances, considering such issues as design preference, manufacturer preference, user preference, cost, changing needs, future technologies, etc., other indicia-accepting arrangements, such as, for example, coatings receptive to inkjet printing inks, coatings receptive to offset printing inks, coatings receptive to screen printing inks, coatings receptive to laser printing inks, coatings receptive to writing, etc., may suffice.

Such indicia-accepting coating preferably is substantially white, preferably opaque white. Such indicia-accepting coating preferably comprises an opacity, whiteness, and gloss at least similar to or better than standard lamination paper. Upon reading this specification, those with ordinary skill in the art will now appreciate that, under appropriate circumstances, considering such issues as design preference, manufacturer preference, user preference, cost, changing needs, future technologies, etc., other indicia-accepting coating arrangements, such as, for example, different colors, different opacities, etc., may suffice.

Such indicia-accepting coating preferably lays flat when exposed to temperature and humidity extremes and preferably resists scuffing and abrasion. Moreover, such indicia-accepting coating preferably does not delaminate when exposed to normal processing, handling, freight, or end use conditions. Furthermore, such indicia-accepting coating preferably does not readily discolor or yellow when exposed UV-light under typical indoor conditions. Moreover, such indicia-accepting coating preferably provides a clean cut when cut with a guillotine-type shear or steel rule die. Moreover, such indicia-accepting coating preferably comprises a low chemical toxicity and a low heavy metal content. Upon reading this specification, those with ordinary skill in the art will now appreciate that, under appropriate circumstances, considering such issues as design preference, manufacturer preference, user preference, cost, changing needs, future technologies, etc., other characteristics for indicia-accepting coatings may suffice.

Such indicia-accepting coating preferably comprises at least one UV-curable coating, alternately preferably at least one water-based coating. UV-curable coatings provide the advantage of being smooth and shiny. Moreover, UV-curable coatings provide the advantage of increasing production speeds. A preferred UV-curable coating suitable for use as indicia-accepting coating preferably comprises Pharmaflex Avalanche Multi-Purpose UV Curable White Printing Ink (product number RPL900704) supplied from Actega located in Wesel, Germany (www.actega.com). Upon reading this specification, those with ordinary skill in the art will now appreciate that, under appropriate circumstances, considering such issues as design preference, manufacturer preference, user preference, cost, changing needs, future technologies, etc., other types of indicia-accepting coatings, such as, for example, indicia-accepting hot-melt coatings, non-water based coatings, UV-curable and water-based coatings, etc., may suffice.

Such indicia-accepting coating preferably is applied to magnetic layer surface 105 by spraying, alternately preferably by fluid application, alternately preferably by at least one flexographic printing process, alternately preferably by at least one gravure coating roll. Upon reading this specification, those with ordinary skill in the art will now appreciate that, under appropriate circumstances, considering such issues as design preference, manufacturer preference, user preference, cost, changing needs, future technologies, etc., other application arrangements, such as, for example, slot-die roller applications, rotary screen applications, other coating methods, etc., may suffice.

Such indicia-accepting formulation of magnetic layer surface (see Table 1) preferably comprises a formulation of magnetizable layer 104 that is receptive to digital printing, preferably digital press printing. Alternately preferably, such indicia-accepting formulation of magnetic layer surface preferably comprises a formulation of magnetizable layer surface 105 that preferably is receptive to digital printing, preferably digital press printing. Upon reading this specification, those with ordinary skill in the art will now appreciate that, under appropriate circumstances, considering such issues as design preference, manufacturer preference, user preference, cost, changing needs, future technologies, etc., other indicia-accepting formulation arrangements, such as, for example, formulations receptive to inkjet printing inks, formulations receptive to laser printing inks, formulations receptive to offset printing inks, formulations receptive to screen printing inks, formulations receptive to writing, etc., may suffice.

Such indicia-accepting formulation of magnetic layer surface preferably allows printing directly on magnetizable layer surface 105. Such indicia-accepting formulation of magnetic layer surface preferably comprises at least one indicia-accepting polymer incorporated within the chemical formulation of magnetizable layer 104, alternately preferably within the chemical formulation of magnetizable layer surface 105. Suitable indicia-accepting polymers preferably comprise polypropylene, alternately preferably polyvinyl chloride, alternately preferably polyester. Upon reading this specification, those with ordinary skill in the art will now appreciate that, under appropriate circumstances, considering such issues as design preference, manufacturer preference, user preference, cost, changing needs, future technologies, etc., other indicia-acceptors, such as, for example, indicia-accepting polymer mixtures, other polymers receptive to digital press printing and/or toners, etc., may suffice.

Figure 5:
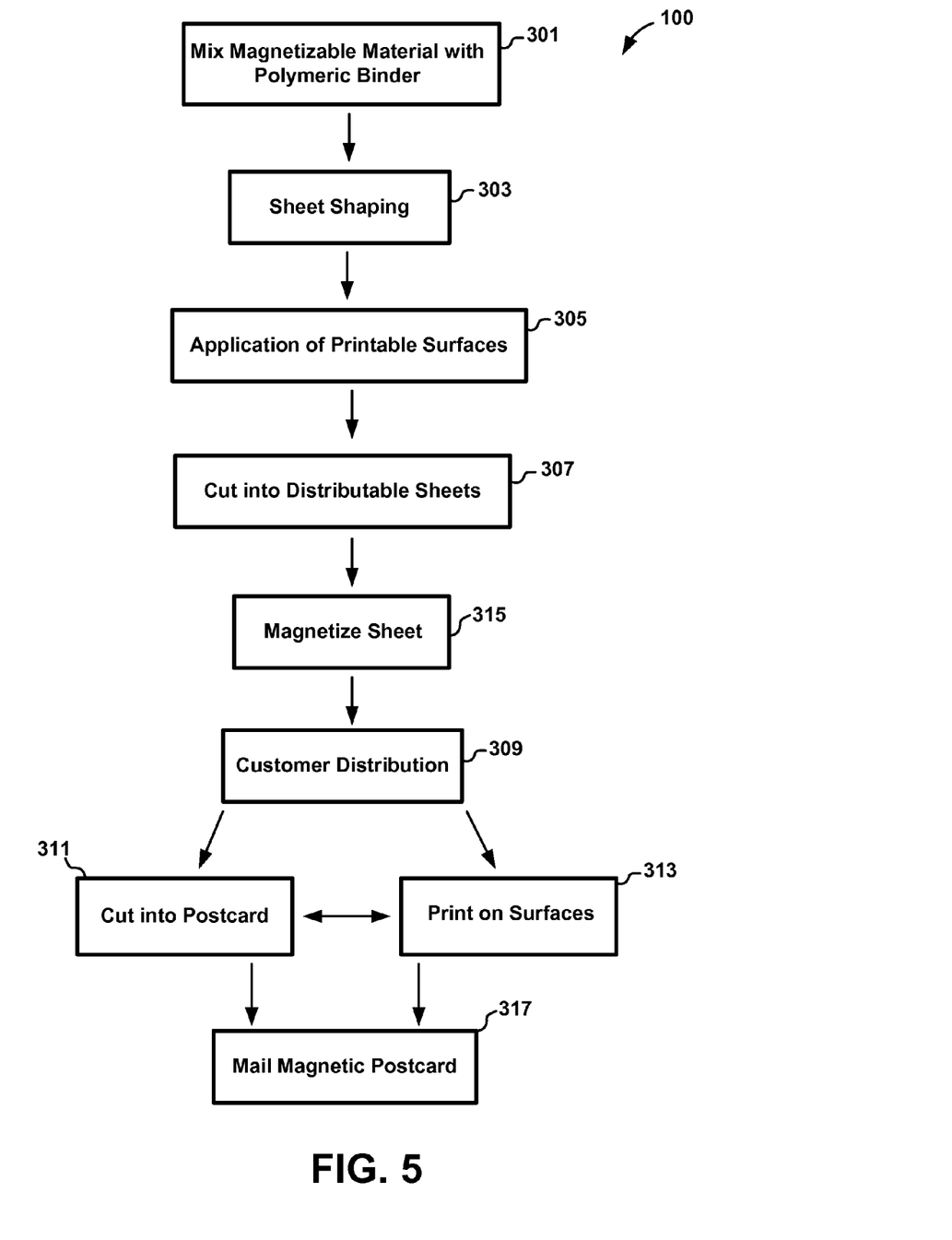
FIG. 5 shows a diagrammatic view, illustrating the steps involved in the manufacture, distribution, and customization of the double printable magnetizable sheet, according to the preferred embodiment of FIG. 1.

FIG. 5 shows a diagrammatic view, illustrating the steps involved in the manufacture, distribution, and customization of double-printable magnetizable sheets 102, according to the preferred embodiment of the present invention. According to step Mix Magnetizable Material with Polymeric Binder 301 (at least embodying herein mixing at least one magnetizable-material, at least one binder, and at least one stiffener to form at least one magnetizable-mixture), at least one of the above-described magnetizable materials (preferably at least one ferrite powder) preferably is mixed with at least one polymeric binder (preferably CPE) and at least one of the above-described stiff binders, preferably in any order. Step Mix Magnetizable Material with Polymeric Binder 301 preferably is performed at elevated temperature, preferably between about 200° F. and about 300° F. Upon reading this specification, those with ordinary skill in the art will now appreciate that, under appropriate circumstances, considering such issues as manufacturer preference, cost, changing needs, future technologies, etc., other mixing procedures, such as, for example, mixing at different temperatures, mixing at defined pressures, mixing magnetic materials and binders in a specific order, etc., may suffice.

Following step Mix Magnetizable Material with Polymeric Binder 301, the above-described mixture of magnetizable material, polymeric binder, and stiff binder(s) preferably is shaped into a sheet structure according to step Sheet Shaping 303, as shown. Step Sheet Shaping 303 (at least embodying herein shaping such at least one magnetizable-mixture into at least one sheet structure using at least one shaping technique selected from the group consisting of at least one extrusion method and at least one calendering method) preferably is performed using at least one extrusion method, alternately preferably by at least one calendering method. Upon reading this specification, those with ordinary skill in the art will now appreciate that, under appropriate circumstances, considering such issues as manufacturer preference, cost, changing needs, future technologies, etc., other sheet shaping methods may suffice.

Following step Sheet Shaping 303, printable surfaces 106 preferably are applied to one or both magnetizable layer surfaces 105 according to step Application of Printable Surfaces 305, as shown. According to step Application of Printable Surfaces 305, first printable surfaces 107 and second printable surface 109 preferably are joined to magnetizable layer surfaces 105 by lamination, alternately preferably by at least one coating method, preferably at least one flexographic printing process, alternately preferably by at least one gravure coating roll, alternately preferably by spray coating, alternately preferably by fluid application (this arrangement at least embodying herein applying at least one first printable layer to at least one first surface of such at least one magnetizable-sheet using at least one application method selected from the group consisting of lamination, flexographic coating, gravure coating, and spraying; and, this arrangement at least embodying herein applying at least one second printable layer to at least one second surface of such at least one magnetizable-sheet using at least one application method selected from the group consisting of lamination, flexographic coating, gravure coating, and spraying). Step Application of Printable Surfaces 305 preferably generates double-printable magnetizable sheet 102, as shown in FIG. 1 (this arrangement at least herein embodying wherein such step of applying such at least one first printable layer and such step of applying such at least one second printable layer generates at least one printable-magnetizable-sheet receptive to printing on such at least one first printable layer and such at least one second printable layer). Upon reading this specification, those with ordinary skill in the art will now appreciate that, under appropriate circumstances, considering such issues as design preference, manufacturer preference, user preference, cost, changing needs, future technologies, etc., other arrangements for applying printable surfaces, such as, for example, slot-die roller applications, other roller applications, gluing, hot-melt bonding, etc., may suffice.

Following step Application of Printable Surfaces 305, double-printable magnetizable sheets 102 preferably are cut into sheet sizes suitable for distributing to customers according to step Cut into Distributable Sheets 307 (at least embodying herein the step of cutting such at least one printable-magnetizable-sheet into at least one shape suitable for distribution to such at least one customer prior to the step of distributing such at least one printable-magnetizable-sheet to such at least one customer), as shown. According to step Cut into Distributable Sheets 307, double-printable magnetizable sheet 102 preferably is cut into twelve-inch by eighteen-inch inch sheets preferably using a guillotine-type cutting tool. Upon reading this specification, those with ordinary skill in the art will now appreciate that, under appropriate circumstances, considering such issues as design preference, manufacturer preference, user preference, cost, changing needs, future technologies, etc., other sheet distribution arrangements, such as, for example, other sheet sizes, distributing to customers as rolled-up sheets, etc., may suffice.

Following step Application of Printable Surfaces 305, double-printable magnetizable sheets 102 preferably are permanently magnetized by exposure to at least one magnetic field according to step Magnetize Sheet 315 (at least embodying herein the step of permanently magnetizing such at least one printable-magnetizable-sheet by exposing such at least one printable-magnetizable-sheet to at least one magnetic-field-source), as shown. Upon reading this specification, those with ordinary skill in the art will now appreciate that, under appropriate circumstances, considering such issues as design preference, manufacturer preference, user preference, cost, changing needs, future technologies, etc., other sheet magnetizing arrangements, such as, for example, magnetizing before cutting into distributable sheets, magnetizing before application of printable surfaces, magnetization performed by the customer, magnetization performed after printing on printable surfaces, etc., may suffice.

Following step Magnetize Sheet 315, double-printable magnetizable sheets 102 preferably are distributed to customers according to step Customer Distribution 309 (at least embodying herein distributing such at least one printable-magnetizable-sheet to at least one customer), as shown. Following step Customer Distribution 309, double-printable magnetizable sheets 102 preferably are further customized as desired by the customer according to step Cut into Postcard 311 and step Print on Surfaces 313, respectively, as shown in FIG. 4. Step Cut into Postcard 311 and step Print on Surfaces 313 preferably are performed in any order, as shown.

In step Cut into Postcard 311 (at least embodying herein providing such at least one customer the option of cutting such at least one printable-magnetic-sheet into at least one length and at least one width acceptable for mailing as at least one postal-service-compliant postcard), the customer preferably is provided with the option of cutting double-printable magnetizable sheet 102 into USPS-compliant postcard dimensions, as shown by width X and length Y in FIG. 3 (this arrangement at least herein embodying wherein such at least one printable-magnetizable-sheet comprises at least one geometry structured and arranged to permit cutting of such at least one printable-magnetizable-sheet into at least one width and at least one length suitable for mailing as such at least one postal-service-compliant postcard). Width X preferably is no larger than six and one-eighth inches and length Y preferably is no larger than eleven and one-half inches. Upon reading this specification, those with ordinary skill in the art will now appreciate that, under appropriate circumstances, considering such issues as user preference, cost, changing needs, changing postal service regulations, etc., other postcard dimensions may suffice. Upon reading this specification, those with ordinary skill in the art will now appreciate that, under appropriate circumstances, considering such issues as design preference, manufacturer preference, user preference, cost, changing needs, etc., cutting into postcard dimensions at the site of manufacture of magnetic sheets may suffice.

In step Print on Surfaces 313 (at least embodying herein providing such at least one customer the option of printing at least one first indicia on such at least one first printable layer using at least one digital press printer; and, at least embodying herein providing such at least one customer the option of printing at least one second indicia on such at least one second printable layer using such at least one digital press printer), the customer preferably is provided with the option of printing desired text, colors, metallic effects, and/or images on first printable surface 107 and/or second printable surface 109 preferably for direct-mail advertising purposes. The customer preferably prints on first printable surface 107 and/or second printable surface 109 using a digital printer, preferably a digital press printer. Upon reading this specification, those with ordinary skill in the art will now appreciate that, under appropriate circumstances, considering such issues as design preference, manufacturer preference, user preference, cost, changing needs, future technologies, etc., other types of printers, such as, for example, offset printers, laser printers, inkjet printers, other types of digital press printers, etc., may suffice. Upon reading this specification, those with ordinary skill in the art will now appreciate that, under appropriate circumstances, considering such issues as design preference, manufacturer preference, user preference, cost, changing needs, etc., printing at the site of manufacture of magnetic sheets may suffice.

Upon completion of Step Cut into Postcard 311 and step Print on Surfaces 313, customized magnetic postcard 112 preferably is generated. The customer then preferably has the option mailing customized magnetic postcard 112 to consumers according to step Mail Magnetic Postcard 317, as shown.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to providing at least one magnetic postcard stock available for customer customization to generate at least one customized magnetic postcard, comprising:
    at least one printable-magnetizable-sheet structured and arranged to provide at least one magnetizable-sheet receptive to printing on at least one first printable surface and at least one second printable surface,
    wherein said at least one printable-magnetizable-sheet comprises at least one magnetizable-layer structured and arranged to provide at least one permanent magnetic field upon magnetization by at least one magnetic field source,
    wherein said at least one magnetizable-layer comprises at least one magnetizable-material structured and arranged to be magnetized by said at least one magnetic field source, and
    wherein said at least one magnetizable-layer further comprises at least one binder structured and arranged to bind said at least one magnetizable material in said at least one magnetizable-layer, and
    at least one first indicia-acceptor structured and arranged to accept at least one first indicia on said at least one first printable surface,
    at least one second indicia-acceptor structured and arranged to accept at least one second indicia on said at least one second printable surface, and
    at least one metallic-effect generator structured and arranged to generate at least one metallic effect on said at least one first printable surface upon acceptance of said at least one first indicia,
    wherein said at least one printable-magnetizable-sheet comprises at least one thickness suitable for mailing as at least one postal-service-compliant postcard, and
    wherein said at least one printable-magnetizable-sheet provides the at least one magnetic postcard stock available for customer-customization to generate the at least one customized magnetic postcard, and
    wherein said at least one magnetizable-layer further comprises at least one stiffener structured and arranged to stiffen said at least one magnetizable-layer.

2. The system, according to claim 1, wherein said at least one printable magnetizable-sheet comprises at least one geometry structured and arranged to permit cutting of said at least one printable-magnetizable-sheet into at least one width and at least one length suitable for mailing as said at least one postal-service-compliant postcard.

3. The system, according to claim 2, further comprising at least one magnetic-field-strength-attenuator structured and arranged to attenuate the strength of said at least one permanent magnetic field to at least one magnetic field strength suitable for mailing as said at least one postal-service compliant postcard.

4. The system, according to claim 2, wherein said at least one thickness is between about one hundredth of an inch and three-tenths of an inch.

5. The system, according to claim 2, wherein:
said at least one first indicia-acceptor is further structured and arranged to accept said at least one first indicia from at least one printer; and
said at least one second indicia-acceptor is further structured and arranged to accept said at least one second indicia from said at least one printer.

6. The system, according to claim 5, wherein said at least one printer comprises at least one digital press printer.

7. The system, according to claim 6, wherein said at least one metallic-effect-generator comprises at least one metallic foil layer.

8. The system, according to claim 7, wherein said at least one metallic-effect-generator is laminated to at least one first surface of said at least one magnetizable-layer.

9. The system, according to claim 8, wherein said at least one first indicia-acceptor comprises at least one indicia accepting coating on said at least one metallic foil layer.

10. The system, according to claim 9, wherein said at least one second indicia-acceptor comprises at least one indicia accepting coating on at least one second surface of said at least one magnetizable-layer.

11. The system, according to claim 10, wherein said at least one indicia-accepting coating comprises at least one ultraviolet-light-curable coating.

12. The system, according to claim 11, wherein said at least one indicia-accepting coating is flexographically applied to said at least one second surface.

13. The system, according to claim 11, wherein said at least one indicia-accepting coating is applied to said at least one second surface using at least one gravure coating roll.

14. The system, according to claim 9, wherein said at least one second indicia-acceptor comprises at least one indicia-accepting layer laminated to at least one second surface of said at least one magnetizable-layer.

15. The system, according to claim 14, wherein said at least one indicia-accepting layer comprises paper.

16. The system, according to claim 14, wherein said at least one indicia-accepting layer comprises at least one indicia-accepting polymer.

17. The system, according to claim 16, wherein said at least one indicia-accepting polymer is selected from the group consisting of polypropylene, polyester, and polyvinyl chloride.

18. The system, according to claim 9, wherein said at least one second indicia-acceptor comprises at least one indicia accepting formulation of said at least one magnetizable-layer.

19. The system, according to claim 9, wherein said at least one binder is further structured and arranged to provide flexibility to said at least one magnetizable-layer.

20. The system, according to claim 19, wherein said at least one binder comprises chlorinated polyethylene.

21. The system, according to Claim 1, wherein said at least one stiffener comprises low-density polyethylene.

22. The system, according to Claim 1, wherein said at least one stiffener is selected from the group consisting of low-density polyethylene and at least one biologically-derived polyester resin.

23. The system, according to claim 21, wherein said at least one stiffener further comprises at least one biologically-derived polyester resin.

24. The system, according to claim 23, wherein said at least one magnetizable-material comprises at least one ferrite powder selected from the group consisting of strontium ferrite and barium ferrite.

25. A system, relating to providing at least one magnetic postcard stock available for customer customization to generate at least one customized magnetic postcard, comprising:
at least one printable-magnetizable-sheet structured and arranged to provide at least one magnetizable-sheet receptive to printing on at least one first printable surface and at least one second printable surface,
wherein said at least one printable-magnetizable-sheet comprises at least one magnetizable-layer structured and arranged to provide at least one permanent magnetic field upon magnetization by at least one magnetic field source,
wherein said at least one magnetizable-layer comprises at least one magnetizable-material structured and arranged to be magnetized by said at least one magnetic field source,
wherein said at least one magnetizable-layer further comprises at least one binder structured and arranged to bind said at least one magnetizable material in said at least one magnetizable-layer,
wherein said at least one magnetizable-layer further comprises at least one stiffener structured and arranged to stiffen said at least one magnetizable-layer,
wherein said at least one first printable surface comprises at least one first indicia-acceptor structured and arranged to accept at least one indicia from at least one digital press printer,
wherein said at least one second printable surface comprises at least one second indicia-acceptor structured and arranged to accept at least one second indicia from said at least one digital press printer,
wherein said at least one printable-magnetizable-sheet comprises at least one thickness suitable for mailing as at least one postal-service-compliant postcard, and
wherein said at least one printable-magnetizable-sheet provides the at least one magnetic postcard stock available for customer-customization to generate the at least one customized magnetic postcard.

26. A system, relating to providing at least one magnetic postcard stock available for customer customization to generate at least one customized magnetic postcard, comprising:
at least one printable-magnetizable-sheet structured and arranged to provide at least one magnetizable-sheet receptive to printing on at least one first printable surface and at least one second printable surface,
wherein said at least one printable-magnetizable-sheet comprises at least one magnetizable-layer structured and arranged to provide at least one permanent magnetic field upon magnetization by at least one magnetic field source,
wherein said at least one magnetizable-layer comprises at least one magnetizable-material structured and arranged to be magnetized by said at least one magnetic field source,
wherein said at least one magnetizable-layer further comprises at least one binder structured and arranged to bind said at least one magnetizable material in said at least one magnetizable-layer,
at least one first indicia-acceptor structured and arranged to accept at least one first indicia on said at least one first printable surface, at least one second indicia-acceptor structured and arranged to accept at least one second indicia on said at least one second printable surface, wherein said at least one first indicia-acceptor comprises at least one ultraviolet-light-curable coating on said at least one first printable surface, wherein said at least one printable-magnetizable-sheet comprises at least one thickness suitable for mailing as at least one postal-service-compliant postcard, wherein said at least one printable-magnetizable-sheet, provides the at least one magnetic postcard stock available for customer-customization to generate the at least one customized magnetic postcard; and wherein said at least one magnetizable-layer further comprises at least one stiffener structured and arranged to stiffen said at least one magnetizable-layer.

27. A system, relating to providing at least one magnetic postcard stock available for customer customization to generate at least one customized magnetic postcard, comprising:

printable-magnetizable-sheet means for providing at least one magnetizable-sheet receptive to printing on at least one first printable surface and at least one second printable surface, wherein said printable-magnetizable-sheet means comprises magnetizable-layer means for providing at least one permanent magnetic field upon magnetization by at least one magnetic field source, wherein said magnetizable-layer means comprises magnetizable-material means for being magnetized by said at least one magnetic field source, wherein said magnetizable-layer means further comprises binder means for binding said magnetizable-material means in said magnetizable-layer means, first indicia-acceptor means for accepting at least one first indicia on said at least one first printable surface, second indicia-acceptor means for accepting at least one second indicia on said at least one second printable surface, metallic-effect generator means for generating at least one metallic effect on said at least one first printable surface upon acceptance of said at least one first indicia, wherein said printable-magnetizable-sheet means comprises at least one thickness suitable for mailing as at least one postal-service-compliant postcard, wherein said printable-magnetizable-sheet means provides the at least one magnetic postcard stock available for customer-customization to generate the at least one customized magnetic postcard, and wherein said at least one magnetizable-layer further comprises at least one stiffener structured and arranged to stiffen said at least one magnetizable-layer.

28. A system, relating to providing at least one magnetic postcard stock available for customer customization to generate at least one customized magnetic postcard, comprising:

at least one printable-magnetizable-sheet structured and arranged to provide at least one magnetizable-sheet receptive to printing on at least one first printable surface and at least one second printable surface, wherein said at least one printable-magnetizable-sheet comprises at least one magnetizable-layer structured and arranged to provide at least one permanent magnetic field upon magnetization by at least one magnetic field source, wherein said at least one magnetizable-layer comprises at least one magnetizable-material structured and arranged to be magnetized by said at least one magnetic field source, wherein said at least one magnetizable-material comprises at least one ferrite powder selected from the group consisting of strontium ferrite and barium ferrite, wherein said at least one magnetizable-layer further comprises at least one binder structured and arranged to bind said at least one magnetizable material in said at least one magnetizable-layer, wherein said at least one binder comprises chlorinated polyethylene, wherein said at least one magnetizable-layer further comprises at least one stiffener structured and arranged to stiffen said at least one magnetizable-layer, wherein said at least one stiffener is selected from the group consisting of low-density polyethylene, at least one biologically-derived polyester resin, and at least one mixture of said low-density polyethylene and said at least one biologically-derived polyester resin, at least one first indicia-acceptor structured and arranged to accept at least one first indicia on said at least one first printable surface, at least one second indicia-acceptor structured and arranged to accept at least one second indicia on said at least one second printable surface, wherein said at least one first indicia-acceptor is further structured and arranged to accept said at least one first indicia from at least one digital press printer, wherein said at least one second indicia-acceptor is further structured and arranged to accept said at least one second indicia from said at least one digital press printer, at least one metallic-effect generator structured and arranged to generate at least one metallic effect on said at least one first printable surface upon acceptance of said at least one indicia, wherein said at least one metallic-effect-generator comprises at least one metallic foil layer, wherein said at least one first indicia-acceptor comprises at least one indicia-accepting coating on said at least one metallic foil layer, wherein said at least one metallic-effect-generator is laminated to at least one first surface of said at least one magnetizable-layer, wherein said at least one printable-magnetizable-sheet comprises at least one thickness suitable for mailing as at least one postal-service-compliant postcard, wherein said at least one thickness is between about one hundredth of an inch and about three-tenths of an inch, wherein said at least one printable-magnetizable-sheet comprises at least one geometry structured and arranged to permit cutting of said at least one printable magnetizable-sheet into at least one length and at least one width suitable for mailing as at least one postal-service-compliant postcard, and wherein said at least one printable-magnetizable-sheet provides the at least one magnetic postcard production intermediate available for customer-customization to generate the at least one customized magnetic postcard.

* * * * *